(12) United States Patent
Pulkrabek et al.

(10) Patent No.: US 11,477,971 B2
(45) Date of Patent: Oct. 25, 2022

(54) BAITCASTER WITH SPOOL DRIVE MECHANISM

(71) Applicant: TrikaUSA Inc., Superior, WI (US)

(72) Inventors: Larry Pulkrabek, Superior, WI (US); Ty Warner, Superior, WI (US); Danny Uribe, Superior, WI (US); Ron Hedberg, Superior, WI (US)

(73) Assignee: TrikaUSA Inc., Superior, WI (US)

( * ) Notice: Subject to any disclaimer, the term of this patent is extended or adjusted under 35 U.S.C. 154(b) by 0 days.

(21) Appl. No.: 17/156,097

(22) Filed: Jan. 22, 2021

(65) Prior Publication Data

US 2021/0137087 A1 May 13, 2021

Related U.S. Application Data

(63) Continuation of application No. 17/073,144, filed on Oct. 16, 2020, now Pat. No. 11,039,606.

(60) Provisional application No. 62/916,574, filed on Oct. 17, 2019.

(51) Int. Cl.
*A01K 89/01* (2006.01)
*A01K 89/015* (2006.01)

(52) U.S. Cl.
CPC ................ *A01K 89/0183* (2015.05)

(58) Field of Classification Search
CPC .... A01K 89/058; A01K 89/03; A01K 89/057; A01K 89/059; A01K 89/0183
See application file for complete search history.

(56) References Cited

U.S. PATENT DOCUMENTS

| 2,512,357 | A | 6/1950 | Maynes |
| 4,927,095 | A | 5/1990 | Young |
| 6,270,028 | B1* | 8/2001 | Kim ..................... A01K 89/015 |
| | | | 242/321 |
| 2007/0007377 | A1 | 1/2007 | Miyazaki et al. |
| 2012/0104135 | A1 | 5/2012 | Toma |
| 2015/0122350 | A1* | 5/2015 | Morgan ............... B65H 75/446 |
| | | | 137/355.26 |
| 2019/0191682 | A1* | 6/2019 | Oogose ............. A01K 89/0193 |

FOREIGN PATENT DOCUMENTS

KR  20180006802 A  10/2018

OTHER PUBLICATIONS

International Search Report and Written Opinion for International Application No. PCT/US2020/056149 dated Jan. 5, 2021, (13 pages).
International Search Report and Written Opinion for International Application No. PCT/US2020/056138 dated Jan. 19, 2021 (11 pages).
Notice of Allowance on U.S. Appl. No. 17/073,144 dated May 7, 2021.

\* cited by examiner

*Primary Examiner* — Emmanuel M Marcelo
(74) *Attorney, Agent, or Firm* — Foley & Lardner LLP

(57) ABSTRACT

A baitcaster includes a body, a spool, a handle, and a drive. The body defines a proximate end and a distal end opposite the proximate end. The spool extends between the proximate end and the distal end. The handle extends from the proximate end and is configured to receive an input torque. The drive is configured to receive the input torque from the handle at the proximate end and drive the spool through a coupling at the distal end.

21 Claims, 10 Drawing Sheets

BAITCASTER WITH SPOOL DRIVE MECHANISM

CROSS-REFERENCE TO RELATED PATENT APPLICATION

The present application is a continuation of U.S. application Ser. No. 17/073,144, filed Oct. 16, 2020, which claims the benefit of and priority to U.S. Provisional Application No. 62/916,574, filed Oct. 17, 2019, the disclosures of which are incorporated herein by reference in their entireties.

BACKGROUND

The present disclosure relates generally to fishing reels. More particularly, the present disclosure relates to baitcasting fishing reels.

SUMMARY

At least one embodiment of the present disclosure relates to a baitcaster. The baitcaster includes a body, a spool, a handle, and a drive. The body defines a proximate end and a distal end opposite the proximate end. The spool extends between the proximate end and the distal end. The handle extends from the proximate end and is configured to receive an input torque. The drive is configured to receive the input torque from the handle at the proximate end and drive the spool through a coupling at the distal end.

Another embodiment of the present disclosure relates to a fishing rod. The fishing rod includes a rod and a baitcaster coupled with the rod. The baitcaster includes a body, a spool, a handle, and a spool drive mechanism. The body defines a handle end and a distal end opposite the handle end. The spool extends between the handle end and the distal end. The handle extends from the handle end and is configured to receive an input torque. The spool drive mechanism is configured to receive the input torque from the handle at the handle end, and drive the spool through a coupling at the distal end.

Another embodiment of the present disclosure relates to a baitcaster. The baitcaster includes a body, a spool, and a spool drive mechanism. The body defines a handle end and a distal end opposite the handle end. The spool extends between the handle end and the distal end. The spool drive mechanism is configured to receive the input torque from a handle at the handle end, and drive the spool through a coupling at the distal end. The spool engagement mechanism is configured to selectively transition between a first state and a second state to fixedly couple or de-couple the spool with an output of the spool drive mechanism at the distal end of the baitcaster.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

The disclosure will become more fully understood from the following detailed description, taken in conjunction with the accompanying figures, wherein like reference numerals refer to like elements, in which.

DETAILED DESCRIPTION

Figure 1:
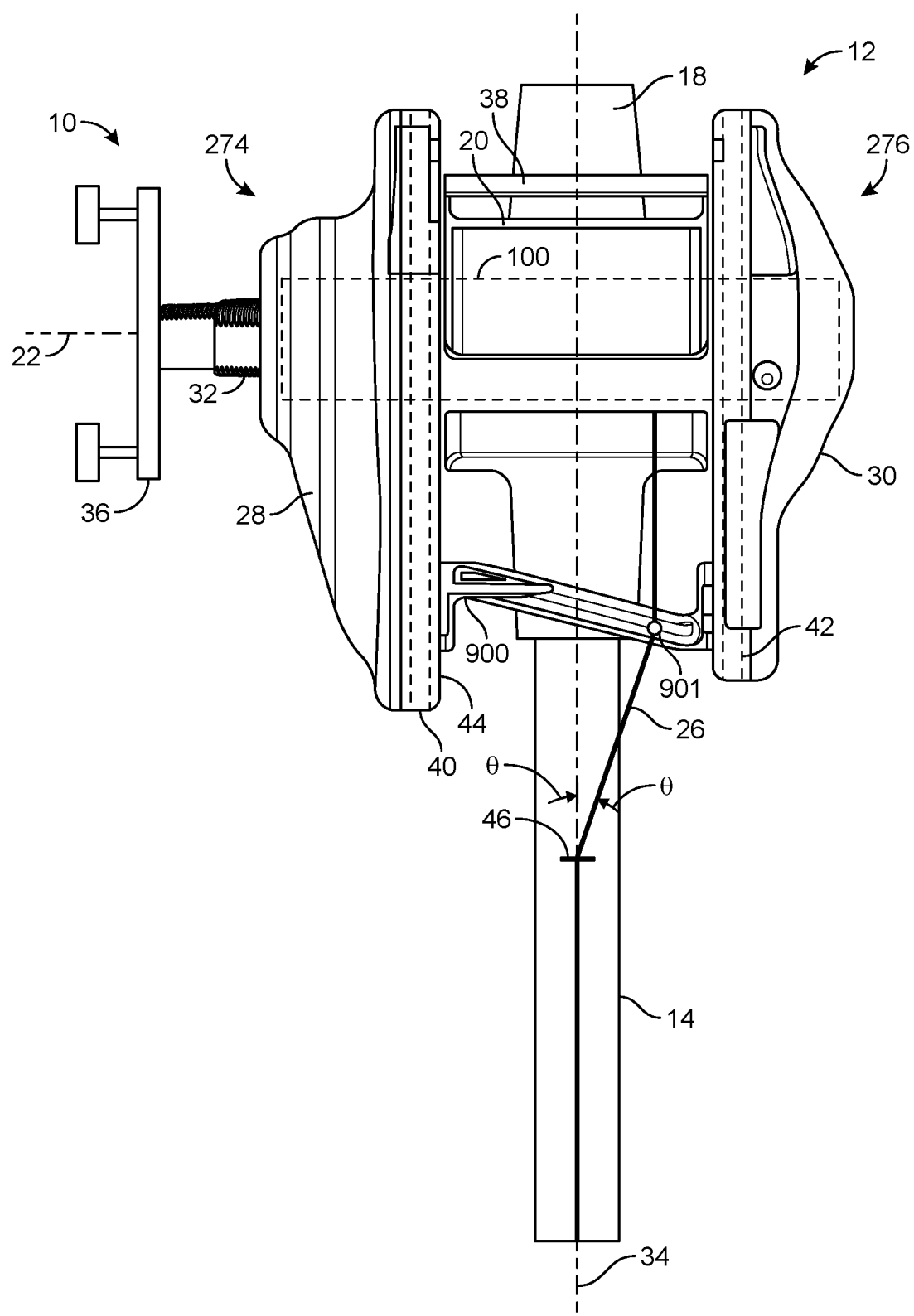
FIG. 1 is a top view of a baitcaster, according to an exemplary embodiment.

Before turning to the FIGURES, which illustrate the exemplary embodiments in detail, it should be understood that the present application is not limited to the details or methodology set forth in the description or illustrated in the FIGURES. It should also be understood that the terminology is for the purpose of description only and should not be regarded as limiting.

Overview

Referring generally to the FIGURES, a fishing reel includes an elongated member or a fishing rod and a baitcaster apparatus. The baitcaster apparatus is fixedly coupled with the fishing rod and is configured to receive a torque input from a user to retrieve or take-up fishing line that extends along the fishing rod. The fishing line may extend through one or more eyelets that are positioned along the fishing rod and guide the fishing line towards the baitcaster apparatus for winding or take-up onto the spool.

The baitcaster apparatus may include body members and structural members. The body members may be spaced apart and cooperatively define an inner volume in which a spool drive mechanism is disposed. The spool drive mechanism can include a gear set positioned at least partially within the spool. The spool drive mechanism may include or be configured to interact with a spool engagement mechanism. The spool drive mechanism includes an input shaft that extends through a first side of the baitcaster (e.g., through the body and structural members on the first side) and is rotatably coupled (e.g., fixedly) with a handle. The handle may receive an input torque from the user to spin the input shaft. The input shaft transfers input torque received from the handle to the gear set that is positioned within the body and/or structural members or extends through the body and/or structural members. The gear set outputs torque through an output shaft. The spool can include a central portion or a spool shaft that includes teeth, engagement portions, interlocking portions, etc. The spool engagement mechanism includes a collar or an engagement member that is rotatably fixedly coupled with the output shaft, but is translatable along the output shaft. For example, the engagement member can include recesses and/or protrusions that extend longitudinally along an inner periphery or an inner surface of the engagement member. The output shaft may include corresponding longitudinal grooves and/or longitudinal protrusions that interlock with the recesses, grooves, protrusions, etc., of the engagement member. In this way, the engagement member and the output shaft may be rotatably fixedly coupled with each other, but translatable relative to each other (e.g., through a spline connection).

The engagement member may be selectably translatable along the output shaft between a first longitudinal position (e.g., a take-up position, an engaged position, etc.) and a second longitudinal position (e.g., a let-out position, a dis-engaged position, etc.). When the engagement member is in the first longitudinal position, the output shaft and the spool are rotatably fixedly coupled. When the engagement member is in the second longitudinal position, the output shaft and the spool are de-coupled from each other. In this way, translation of the engagement member between the first longitudinal position and the second longitudinal position can selectably rotatably fixedly couple the spool with the output shaft.

The engagement member can include a corresponding interfacing portion, teeth, interlocking members, longitudinal protrusions, longitudinal recesses, etc., that may be configured to interlock with the spool shaft when the engagement member is transitioned or translated into the first longitudinal position along the output shaft. In some embodiments, the baitcaster apparatus includes a lever, a bar, a button, etc., that can be depressed, moved, rotated, etc., by the user. In this way, the user may press, rotate, move, etc., the lever, bar, button, etc., to translate or transition the engagement member between the take-up position and the let-out position to selectably rotatably fixedly couple the spool with the output shaft. When the spool is rotatably de-coupled from the output shaft, the spool and the output shaft are free to rotate relative to each other.

The engagement member may rotatably fixedly couple with the spool at an end, side, or portion of the baitcaster apparatus that is opposite a handle side of the baitcaster apparatus. In this way, the baitcaster apparatus may receive input torque from a first side, while the spool is driven from a second, opposite, side of the baitcaster apparatus.

Baitcaster

Figure 2:
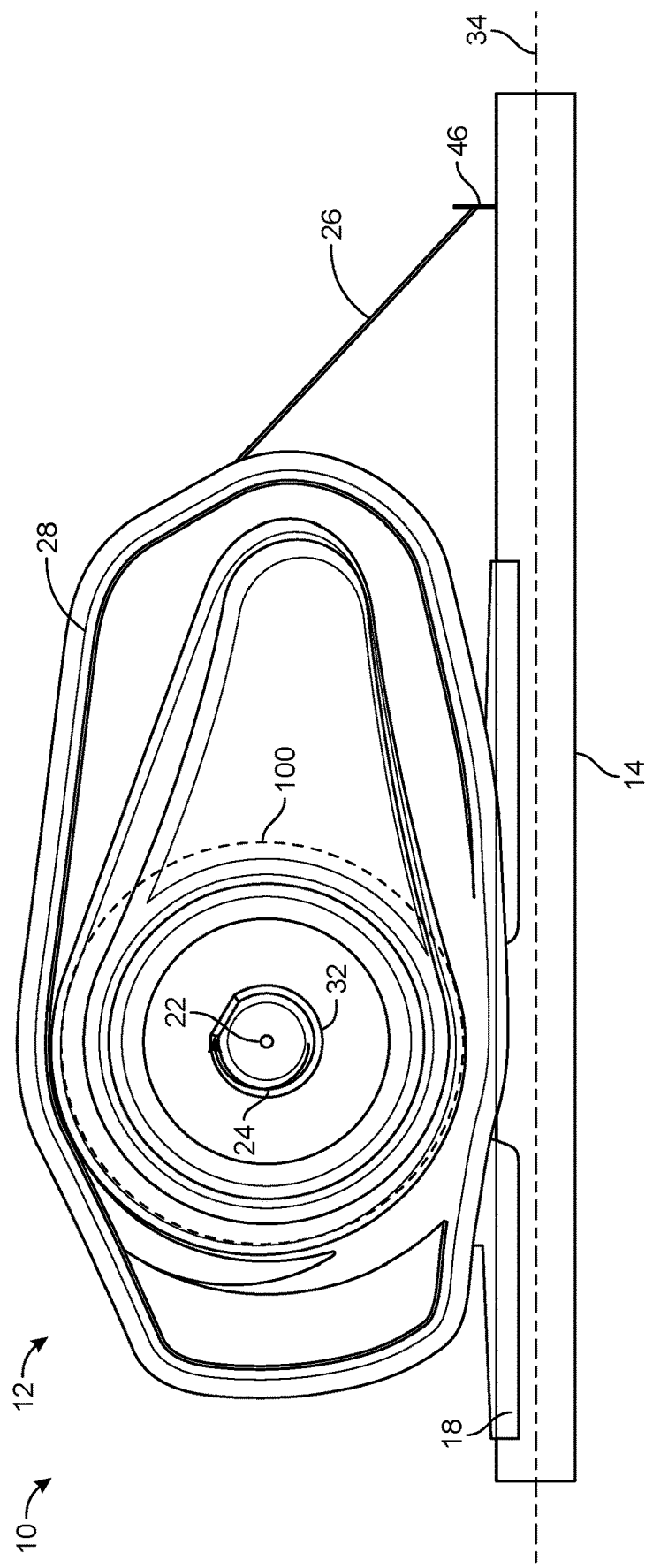
FIG. 2 is a side view of the baitcaster of FIG. 1, according to an exemplary embodiment.
Figure 3:
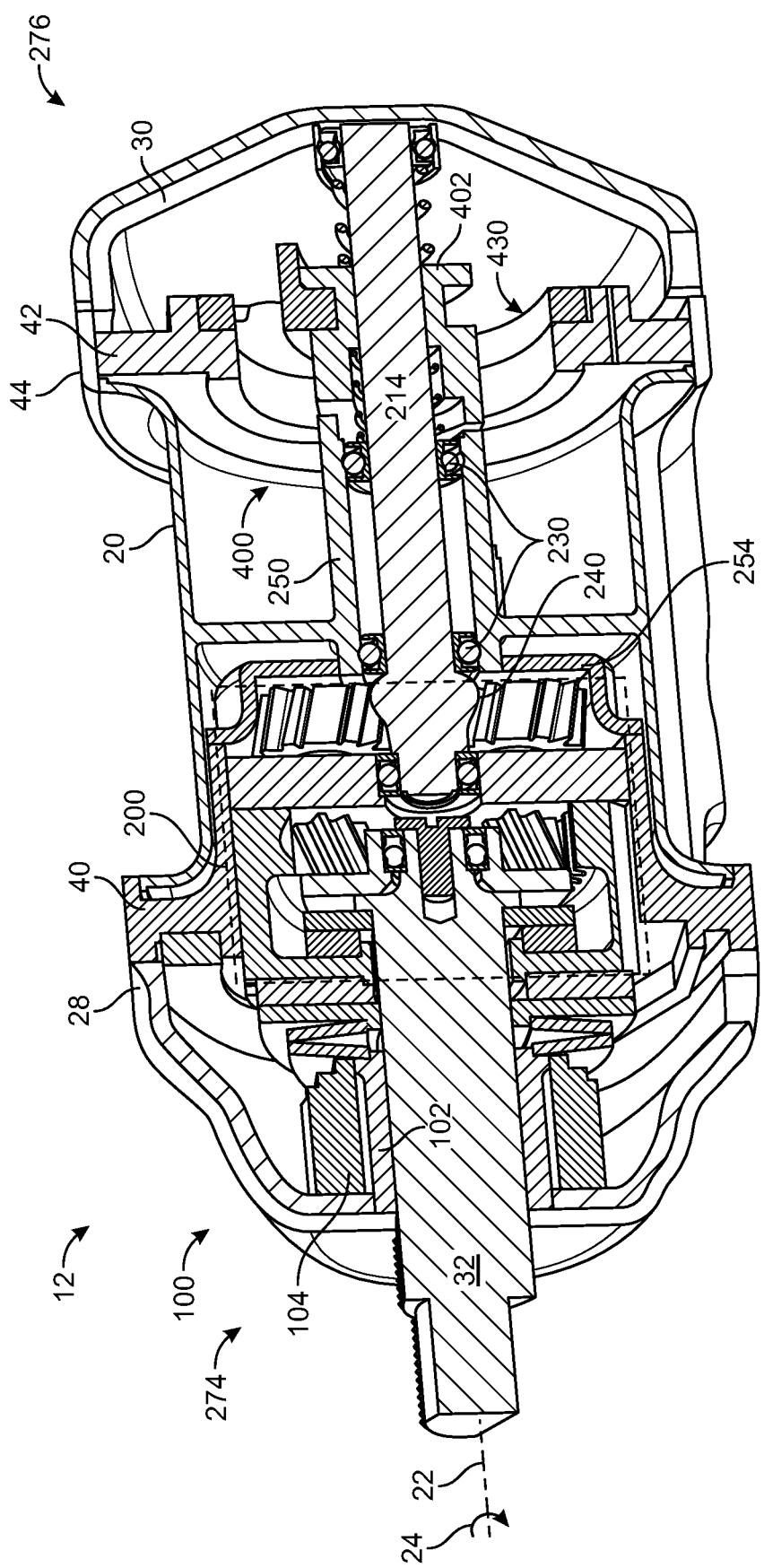
FIG. 3 is a sectional view of the baitcaster of FIG. 1 including a spool drive mechanism and a spool engagement mechanism, according to an exemplary embodiment.
Figure 4:
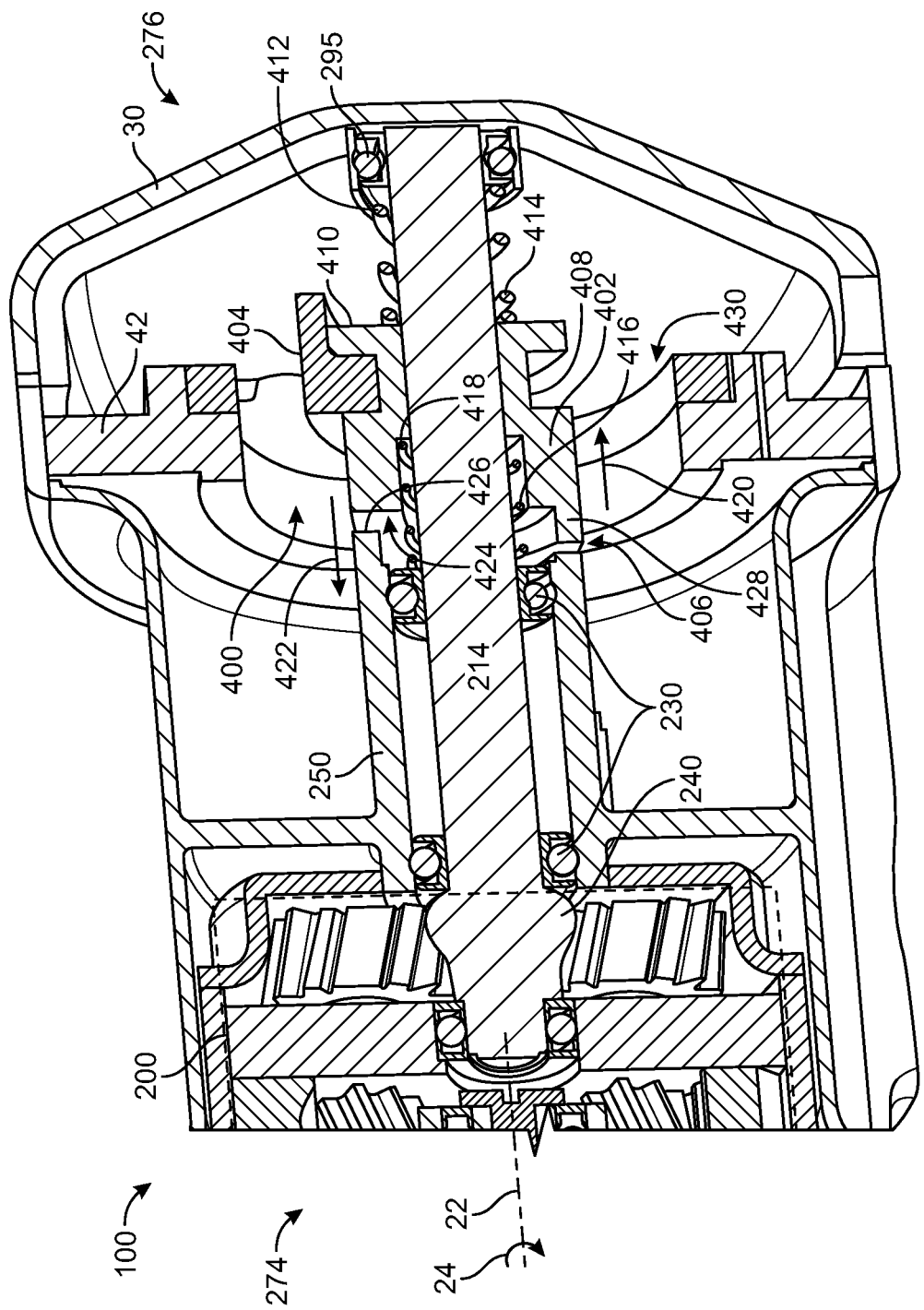
FIG. 4 is a perspective sectional view of the baitcaster of FIG. 3, showing the spool engagement mechanism in greater detail, according to an exemplary embodiment.
Figure 5:
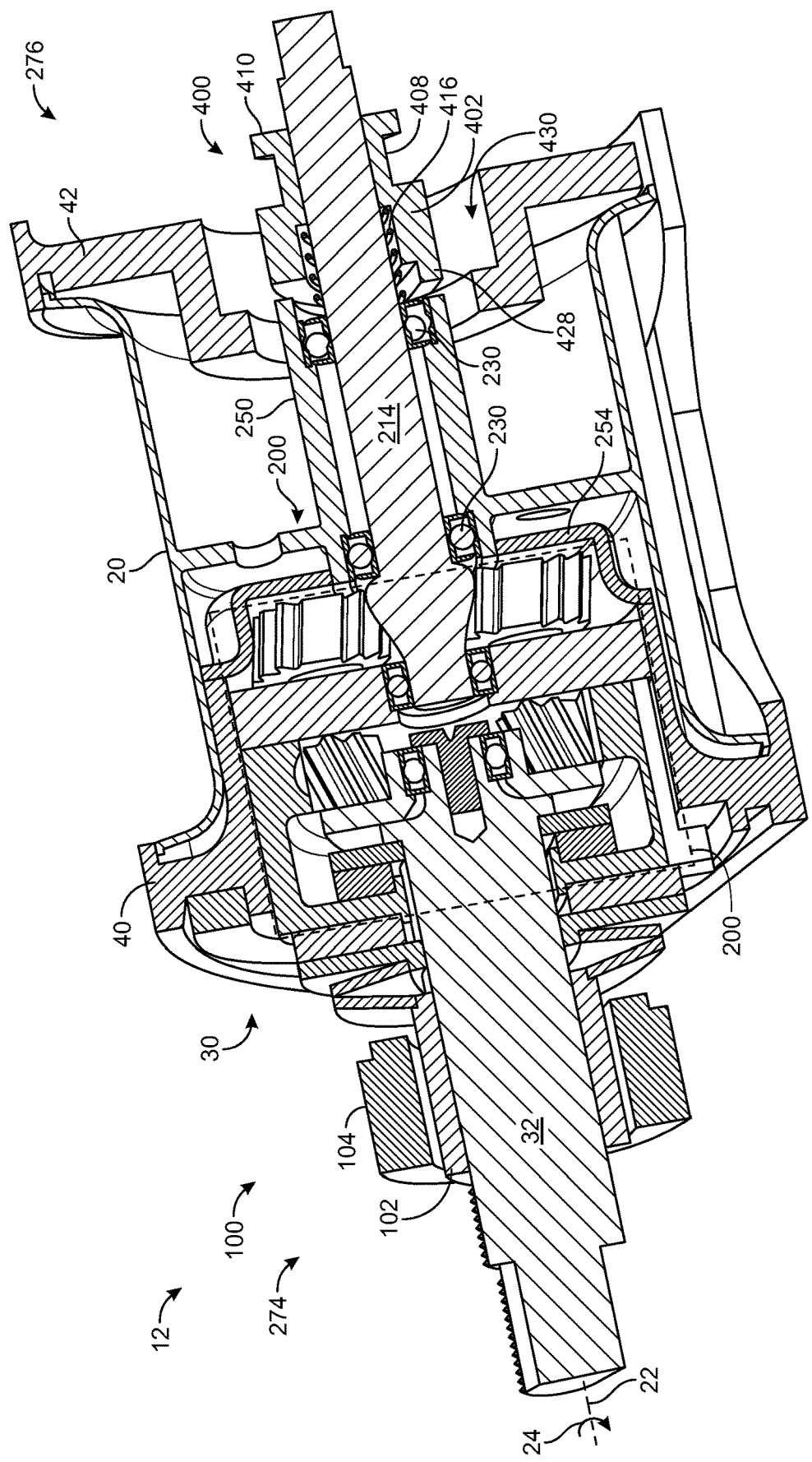
FIG. 5 is a sectional view of the baitcaster of FIG. 3, showing the spool engagement mechanism, according to an exemplary embodiment.
Figure 6:
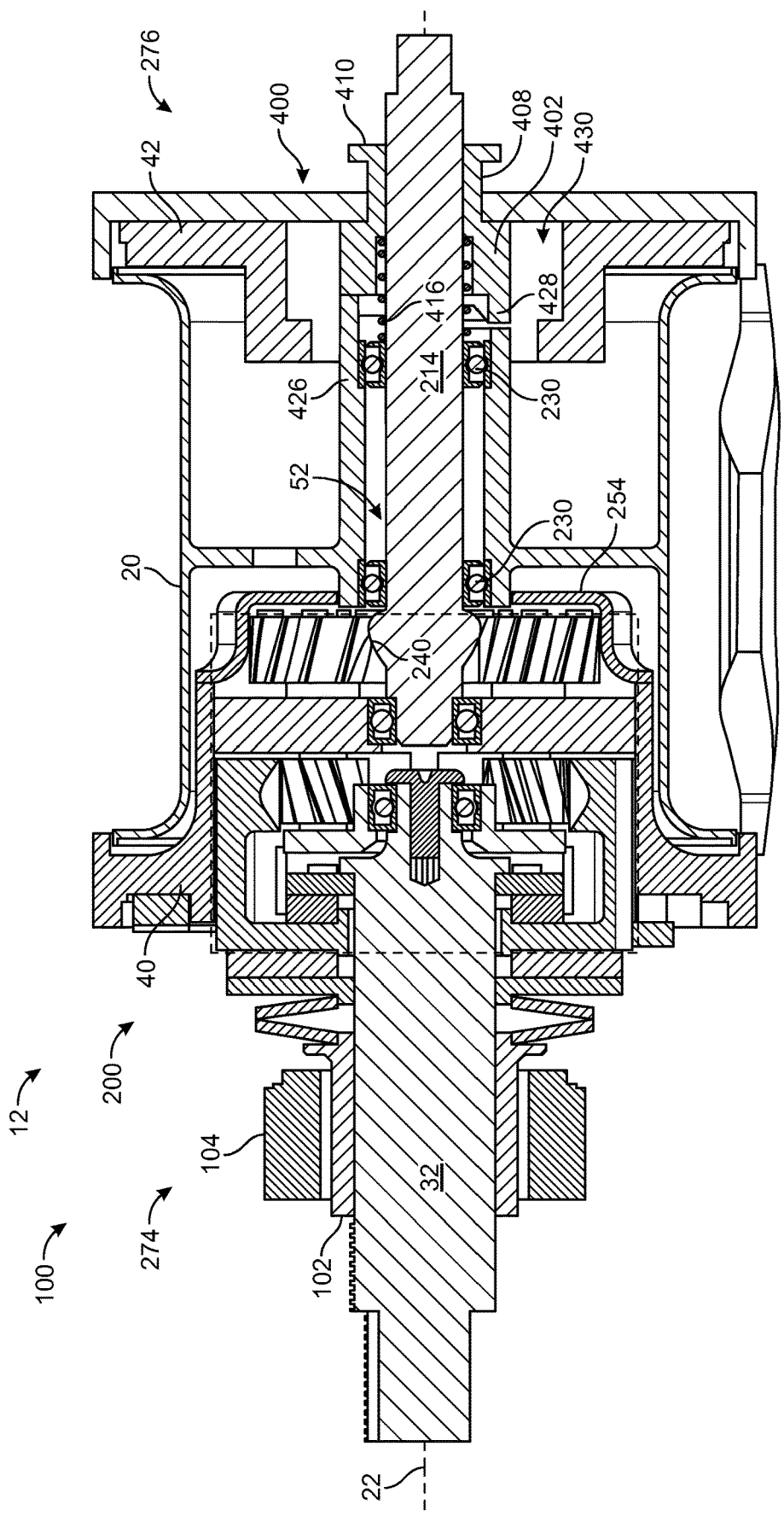
FIG. 6 is a perspective sectional view of the baitcaster of FIG. 1, showing the spool engagement mechanism, according to an exemplary embodiment.
Figure 7:
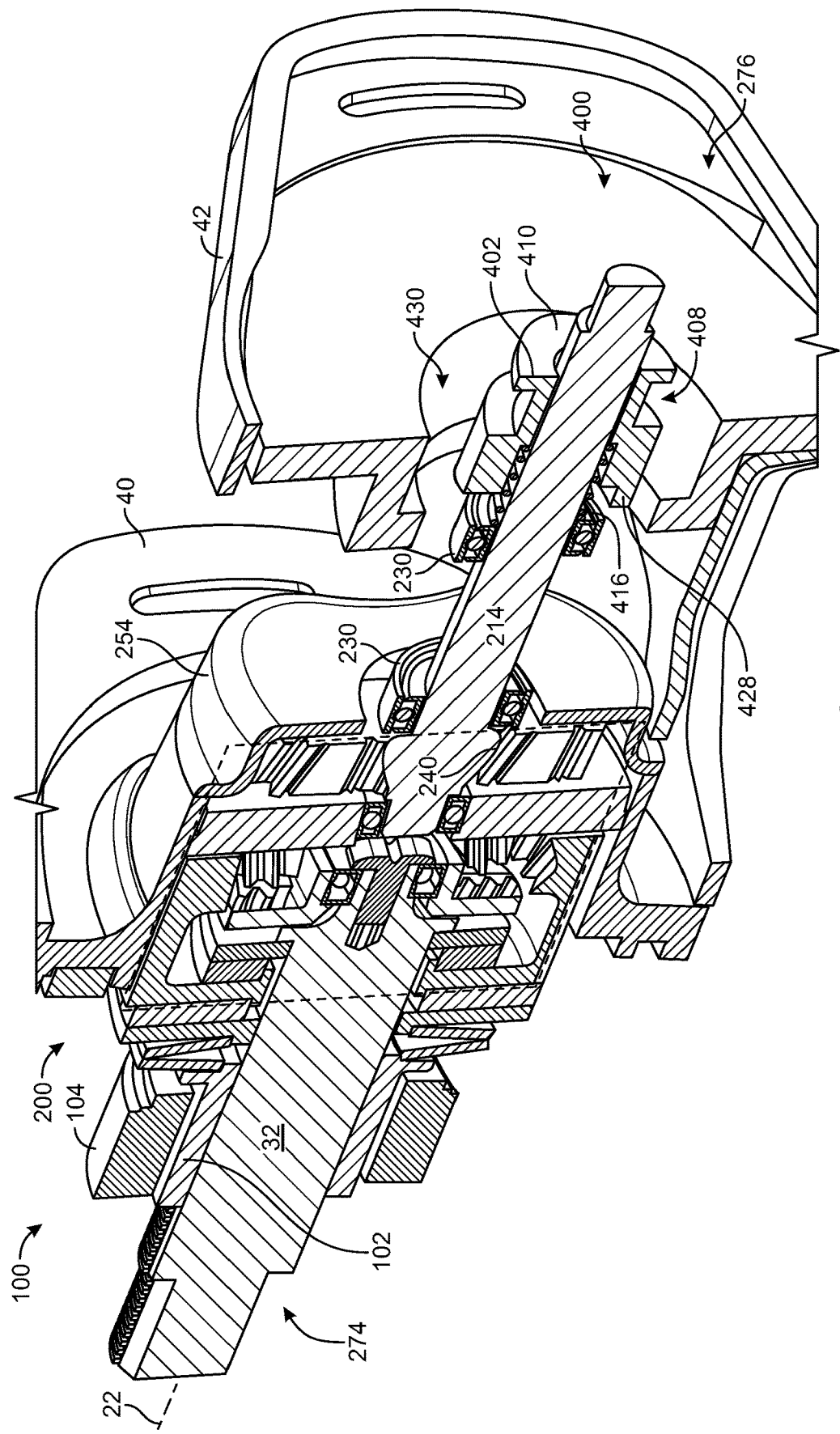
FIG. 7 is a sectional view of the baitcaster of FIG. 1, showing the spool engagement mechanism, according to an exemplary embodiment.
Figure 8:
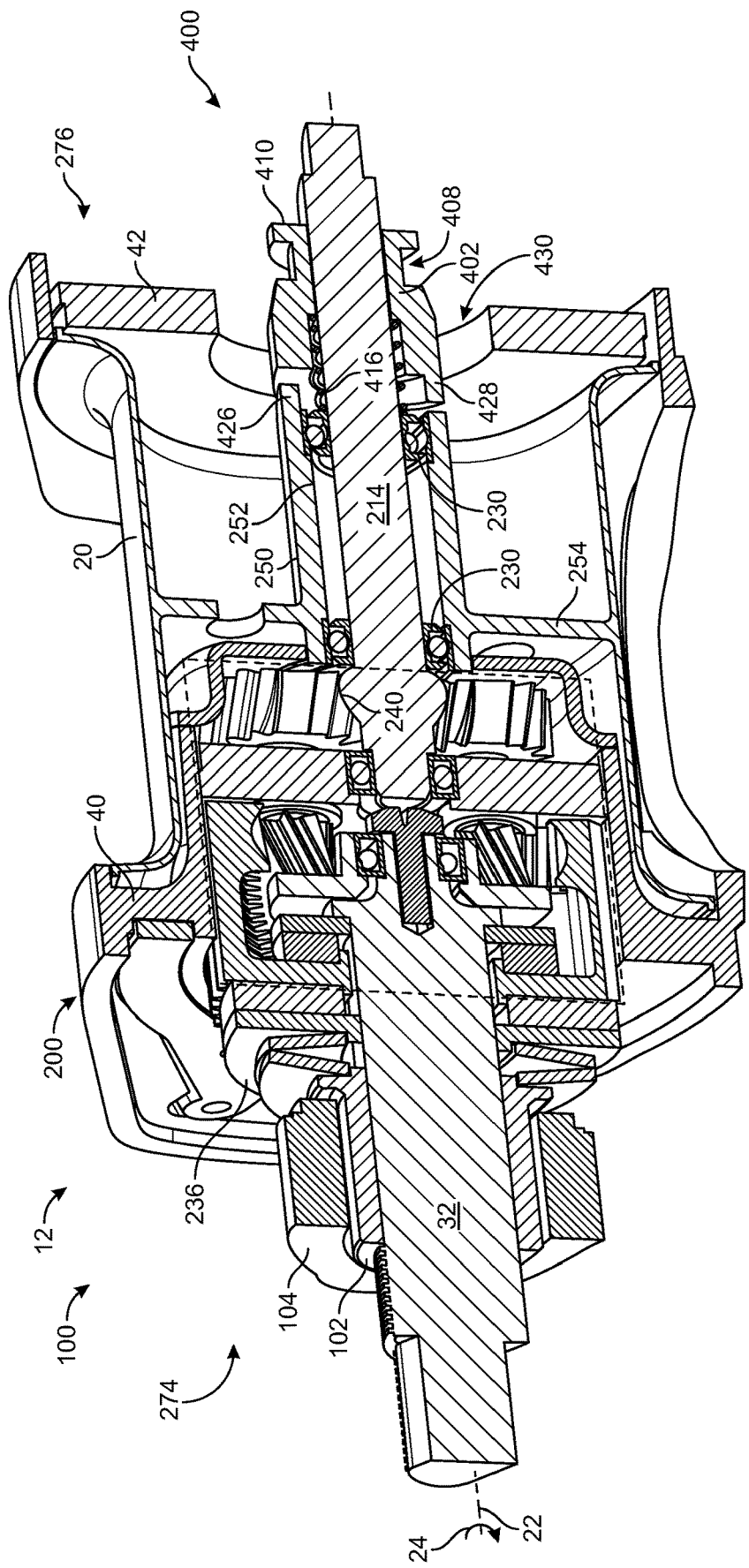
FIG. 8 is a perspective sectional view of the baitcaster of FIG. 1, showing the spool engagement mechanism, according to an exemplary embodiment.

Referring particularly to FIGS. 1-3, a fishing reel, a baitcasting reel, a baitcaster, etc., shown as fishing reel 10 includes a rod, a pole, an elongated member, a flexible member, etc., shown as rod 14 and a reel apparatus, a reel mechanism, a reel assembly, a fishing line retrieval apparatus, etc., shown as reel 12. Reel 12 is fixedly coupled, attached, mounted, etc., with rod 14. In some embodiments, reel 12 is fixedly coupled with rod 14 through mounts, attachment members, etc., shown as mount 18. Mount 18 may extend from a bottom portion of reel 12 and fixedly couple with rod 14.

Reel 12 includes a spool, a barrel, a cylindrical member, etc., shown as spool 20. Spool 20 may be rotatably coupled with an input shaft, a rotatable shaft, a shaft, etc., shown as input shaft 32 such that spool 20 rotates when input shaft 32 is turned. In some embodiments, input shaft 32 is rotatably or fixedly coupled with a handle 36. An axis 22 extends through input shaft 32 and spool 20. Input shaft 32 and spool 20 can be co-axial with each other about axis 22. Handle 36 facilitates an input torque to input shaft 32 about axis 22 for driving spool 20. In some embodiments, handle 36 and input shaft 32 are configured to rotate in a first direction (e.g., direction 24) to take-up fishing line 26 so that fishing line 26 is wound onto spool 20.

Fishing line 26 can extend along rod 14 and may be guided by one or more eyelets 46. Eyelets 46 can be positioned along rod 14 and can include an opening, a hole, an aperture, etc., through which fishing line 26 passes. Fishing line 26 may extend from an eyelet 46 that is most proximate reel 12 onto spool 20. Rod 14 defines a central axis 34 that extends longitudinally through a center of rod 14. Fishing line 26 may be guided from eyelet 46 that is most proximate reel 12 to spool 20. Fishing line 26 that is between the eyelet 46 most proximate reel 12 and central axis 34 may define an angle $\theta$. The angle $\theta$ may change from a maximum positive value $\theta_{+,max}$ to a maximum negative value $\theta_{-,max}$ as fishing line 26 is taken up or reeled onto spool 20.

Reel 12 includes a first or a handle-side body member, housing member, structural member, etc., shown as first body member 28, and a second body member, housing member, structural member, etc., shown as second body member 30. First body member 28 and second body member 30 can define opposite sides of reel 12. Spool 20 can be positioned between first body member 28 and second body member 30 and may extend between first body member 28 and second body member 30. Spool 20 can be supported or rotatably coupled on either end with first body member 28 and second body member 30. Spool 20 may rotate relative to first body member 28 and second body member 30.

Reel 12 includes a guide member 900 that is configured to extend between first body member 28 and second body member 30 and be driven to rotate by rotation of handle 36. In some embodiments, guide member 900 is configured to engage fishing line 26 at a contact point 901. Fishing line 26 may be guided onto spool 20 from contact point 901. For example, fishing line 26 may extend from contact point 901 onto spool 20 where it is then wound onto spool 20. Rotation of guide member 900 can result in reciprocative translation of contact point 901. For example, as guide member 900 rotates, contact point 901 may shift back and forth along guide member 900 between opposite ends of guide member 900. In this way, fishing line 26 is guided and wound onto spool 20 along an entire longitudinal length of spool 20, thereby facilitating an even distribution of fishing line 26 on spool 20 and reducing knotting and/or bunching of fishing line 26 on spool 20 (e.g., an uneven distribution of fishing line 26). Evenly distributing and winding fishing line 26 on spool 20 can reduce a likelihood of fishing line 26 snagging, knotting, or becoming tangled when fishing line 26 is let out (e.g., released) from spool 20 (e.g., for casting operations).

Referring still to FIGS. 1-2, input shaft 32 extends through first body member 28 and protrudes outwards from first body member 28. Handle 36 is coupled with input shaft 32 exterior of first body member 28 so that handle 36 can be operated by a fisherman's right hand while rod 14 is held by the fisherman's left hand. In other embodiments, input shaft 32 extends outwards through second body member 30 so that handle 36 is operated by the fisherman's left hand while rod 14 is held by the fisherman's right hand.

Input shaft 32 is configured to turn and drive rotation of spool 20 through a spool drive mechanism, a compound planetary gear assembly, a gear train, a gear assembly, etc., shown as spool drive mechanism 100. Spool drive mechanism 100 can be configured to receive torque from input shaft 32 and transfer the torque to spool 20 so that spool 20 rotates to take up or wind fishing line 26 onto spool 20.

Referring particularly to FIG. 1, reel 12 includes an input member, a bar, a rotatable linkage, a translatable member, a lever, a button, etc., shown as lever 38. Lever 38 may extend between first body member 28 and second body member 30 and may be pivotable, rotatable, and/or translatable between a first position and a second position. In some embodiments, lever 38 is configured to be transitioned between the first position and the second position to selectively couple input shaft 32 with spool 20.

Referring still to FIG. 1, reel 12 can include a first structural member, a first frame member, etc., shown as first frame member 40, and a second structural member, a second frame member, etc., shown as second frame member 42. First frame member 40 and second frame member 42 can be parallel with each other and may both extend in a longitudinal direction that is defined by central axis 34. First frame member 40 and second frame member 42 may be positioned within first body member 28 and second body member 30, respectively or may be positioned within an inner volume that is at least partially defined by first body member 28 and second body member 30.

Referring still to FIG. 1, reel 12 can include a central body member, a central housing, etc., shown as body member 44. In some embodiments, body member 44 extends between first body member 28 and second body member 30. First body member 28 and body member 44 may cooperatively define a first inner volume in which first frame member 40 is positioned. Second body member 30 and body member 44 may cooperatively define a second inner volume in which second frame member 42 is positioned.

Spool Drive Mechanism

Spool Engagement Mechanism

Referring particularly to FIGS. 3-8, spool drive mechanism 100 includes a gear set 200, a collar 102, and a one-way bearing, clutch, sprag bearing, sprag clutch, etc., shown as one-way bearing 104. Gear set 200 is positioned at least partially within an inner volume of spool 20 and within an inner volume defined by an inner body member 254, body member 44, and first body member 28. Gear set 200 can be a planetary gear set or any other gear train, gear box, or gear configuration that is configured to receive input torque or rotational kinetic energy from input shaft 32. Gear set 200 is configured to receive the input torque or the rotational kinetic energy from input shaft 32 and transfer the input torque to an output shaft 214.

Output shaft 214 may extend through an inner volume of spool 20 defined by a central member, a cylindrical member, a central sleeve, etc., of spool 20, shown as spool shaft 250. Spool shaft 250 is rotatably coupled with spool shaft 250 through one or more bearings, ball bearings, roller bearings, etc., shown as spool bearings 230. A radially outwards facing surface of an outer race of spool bearings 230 is rotatably fixedly coupled (e.g., press fit, keyed, slip fit, etc.) with a radially inwards facing surface of spool shaft 250. A radially inwards facing surface of an inner race of spool bearings 230 is rotatably fixedly coupled with a radially outwards facing surface of output shaft 214. In some embodiments, the output shaft 214 is configured to selectably rotate freely relative to spool 20. For example, spool 20 and output shaft 214 may be configured to rotate freely relative to each other when reel 12 is transitioned into a let-out state. In some embodiments, spool 20 and output shaft 214 are configured to rotate in unison when reel 12 is transitioned into a take-out state.

Referring still to FIGS. 3-8, spool drive mechanism 100 includes a spool engagement mechanism 400, according to an exemplary embodiment. Spool engagement mechanism 400 is configured to transition between a first state (e.g., a take-up state) to rotatably fixedly couple spool 20 with output shaft 214 and a second state (e.g., a let-out state) to de-couple spool 20 and output shaft 214. Spool engagement mechanism 400 includes a first member, an engagement member, a spool shaft engagement member, a collar, etc., shown as engagement member 402. Engagement member 402 includes an inner volume, a central aperture, a through-hole, etc., shown as central volume 414 through which output shaft 214 extends. Output shaft 214 and engagement member 402 may extend through an aperture, an inner volume, a hole, a bore, a window, an opening, etc., of second frame member 42, shown as opening 430.

Output shaft 214 is configured to engage, interface with, etc., one or more output gears of gear set 200 at a first or proximate end. Output shaft 214 is supported and rotatably coupled at a second or distal end with second body member 30. Output shaft 214 can be supported at the second or distal end with second body member 30 through a bearing 295. The first or proximate end of output shaft 214 can include teeth 240 that are configured to engage corresponding gears, teeth, etc., of gear set 200.

Engagement member 402 is configured to slidably couple with output shaft 214 such that engagement member 402 can translate along output shaft 214. In some embodiments, engagement member 402 is rotatably fixedly coupled with output shaft 214 (e.g., through a spline coupling, a spline connection, a keyed connection, etc.) so that engagement member 402 is configured to rotate in unison with rotation of output shaft 214. In this way, engagement member 402 may be free to translate along output shaft 214 in a longitudinal direction defined by axis 22, while being rotatably fixedly coupled with output shaft 214.

Spool engagement mechanism 400 includes an adjustment member, a linkage, a bar, an elongated member, etc., shown as linkage 404. Linkage 404 is configured to drive engagement member 402 to translate along output shaft 214. In some embodiments, linkage 404 is configured to drive engagement member 402 to translate between a first longitudinal position on output shaft 214 and a second longitudinal position on output shaft 214.

Engagement member 402 includes an outwards facing surface, an exterior face, a contact surface, an engagement surface, etc., shown as engagement surface 410. A spring (e.g., a compression spring), shown as first spring 412 is positioned between engagement member 402 and bearing 295 and is configured to engage, contact, abut, etc., engagement surface 410 of engagement member 402 and bearing 295. First spring 412 may be configured to bias or drive engagement member 402 to translate along output shaft 214 in direction 422. Engagement member 402 also includes a bore, a blind hole, an aperture, etc., that extends into a side of engagement member 402 that is opposite engagement surface 410. The blind hole may have a diameter that is larger than a diameter of central volume 414, thereby defining a shoulder or a step 418 at a transition between central volume 414 and the blind hole.

Spool engagement mechanism 400 can include a second spring 416 (e.g., a compression spring) that is configured to engage, abut, contact, etc., step 418 of engagement member 402 at a first end, and engage, abut, contact, etc., one of spool bearings 230 at a second or opposite end. Second spring 416 can be configured to bias or drive engagement member 402 to translate along output shaft 214 in a direction 420 that is opposite direction 422. In this way, first spring 412 is configured to drive or bias engagement member 402 to translate in direction 422, while second spring 416 is configured to drive or bias engagement member 402 to translate in direction 420. In some embodiments, second spring 416 has a stiffness that is less than a stiffness of first spring 412.

Engagement member 402 includes an inwards end 424 that is opposite engagement surface 410. Spool shaft 250 includes an outwards end 406 that is proximate inwards end 424 of engagement member 402. Outwards end 406 of spool shaft 250 may include an interfacing portion 426 that is configured to interlock with a corresponding interfacing portion 428 of engagement member 402. For example, interfacing portion 426 of spool shaft 250 and interfacing portion 428 of engagement member 402 can be teeth or longitudinal protrusions that are configured to interlock with each other when engagement member 402 is transitioned into the first longitudinal position. When engagement member 402 is transitioned into the first longitudinal position along output shaft 214, interfacing portion 428 of engagement member 402 interlocks with, or rotatably fixedly couples with interfacing portion 426 of spool shaft 250. When engagement member 402 is transitioned into the second longitudinal position along output shaft 214, interfacing portion 426 of spool shaft 250 and interfacing portion 428 of engagement member 402 are de-coupled from each other such that spool shaft 250 and output shaft 214 are free to rotate relative to each other. In some embodiments, when engagement member 402 is transitioned or translated to the first longitudinal position along output shaft 214 such that engagement member 402 and spool shaft 250 are interlocked, spool bearings 230 rotate in unison with spool shaft 250, spool 20, and engagement member 402.

In some embodiments, engagement member 402 includes an annular groove 408. Annular groove 408 is configured to receive a correspondingly shaped portion of linkage 404 therewithin. Linkage 404 can be driven to translate or rotate by lever 38. For example, when lever 38 is pressed or translated to a first position (e.g., downwards), linkage 404 drives engagement member 402 to translate along output shaft 214 (e.g., in direction 420 or in direction 422) between the first longitudinal position and the second longitudinal position along output shaft 214. In some embodiments, pressing, moving, or rotating lever 38 downwards into the first position drives linkage 404 to translate in direction 420 to an engaged position (i.e., the first longitudinal position), while lifting, moving, or rotating lever 38 upwards into the second position drives linkage 404 to translate in direction 422 to a disengaged position (i.e., the second longitudinal position). In other embodiments, pressing, moving, or rotating lever 38 downwards into the first position drives linkage 404 to translate in direction 422 to the disengaged position (i.e., the second longitudinal position), while lifting, moving, or rotating lever 38 upwards into the second position drives linkage 404 to translate in direction 420 to the engaged position (i.e., the first longitudinal position).

Referring still to FIGS. 3-8, input shaft 32 can be driven by spinning handle 36 in direction 24. Input shaft 32 receives rotational kinetic energy or torque from a first end, a proximate end, a handle end, etc., of reel 12, shown as handle end 274. Handle end 274 may be a side, portion, or end of reel 12 that is proximate handle 36. In some embodiments, input shaft 32 receives the torque input from an end of reel 12 that is proximate first body member 28 or first frame member 40. The torque input that is received by input shaft 32 is transferred through gear set 200 to spool 20. The torque may be increased or decreased across gear set 200 before it is provided to spool 20 to drive spool 20 for taking-up or reeling fishing line 26.

The torque may be provided to spool 20 at a second end, a second side, a distal end, a distal portion, etc., of reel 12, shown as distal end 276. The torque may be provided to spool 20 to drive spool 20 through the engagement between spool shaft 250 and engagement member 402. In some embodiments, the torque is provided to spool 20 at spool shaft 250 by selectably rotatably fixedly coupling spool 20 and output shaft 214 (e.g., by transitioning engagement member 402 into the first longitudinal position) and driving output shaft 214, thereby driving spool shaft 250 and spool 20. In some embodiments, distal end 276 is a side or end of reel 12 that is opposite handle end 274. For example, spool 20 may receive input torque from output shaft 214 through engagement member 402 at an end, side, or portion, of reel 12 that is proximate second body member 30, second frame member 42, etc. In this way, input torque is provided to input shaft 32 from a first end or a first side of reel 12 (i.e., handle end 274), while spool 20 is driven to rotate about axis 22 from a second end or distal side of reel 12 (i.e., distal end 276).

Advantageously, driving spool 20 from an end, side, or portion of reel 12 that is opposite handle end 274 facilitates an evenly weighted reel 12. For example, a weight of handle 36 may be countered or balanced by a weight of engagement member 402. In some embodiments, moments produced by handle 36 counter, equal, or balance with moments produced by engagement member 402.

Plunger Sub-Assembly

Figure 9:
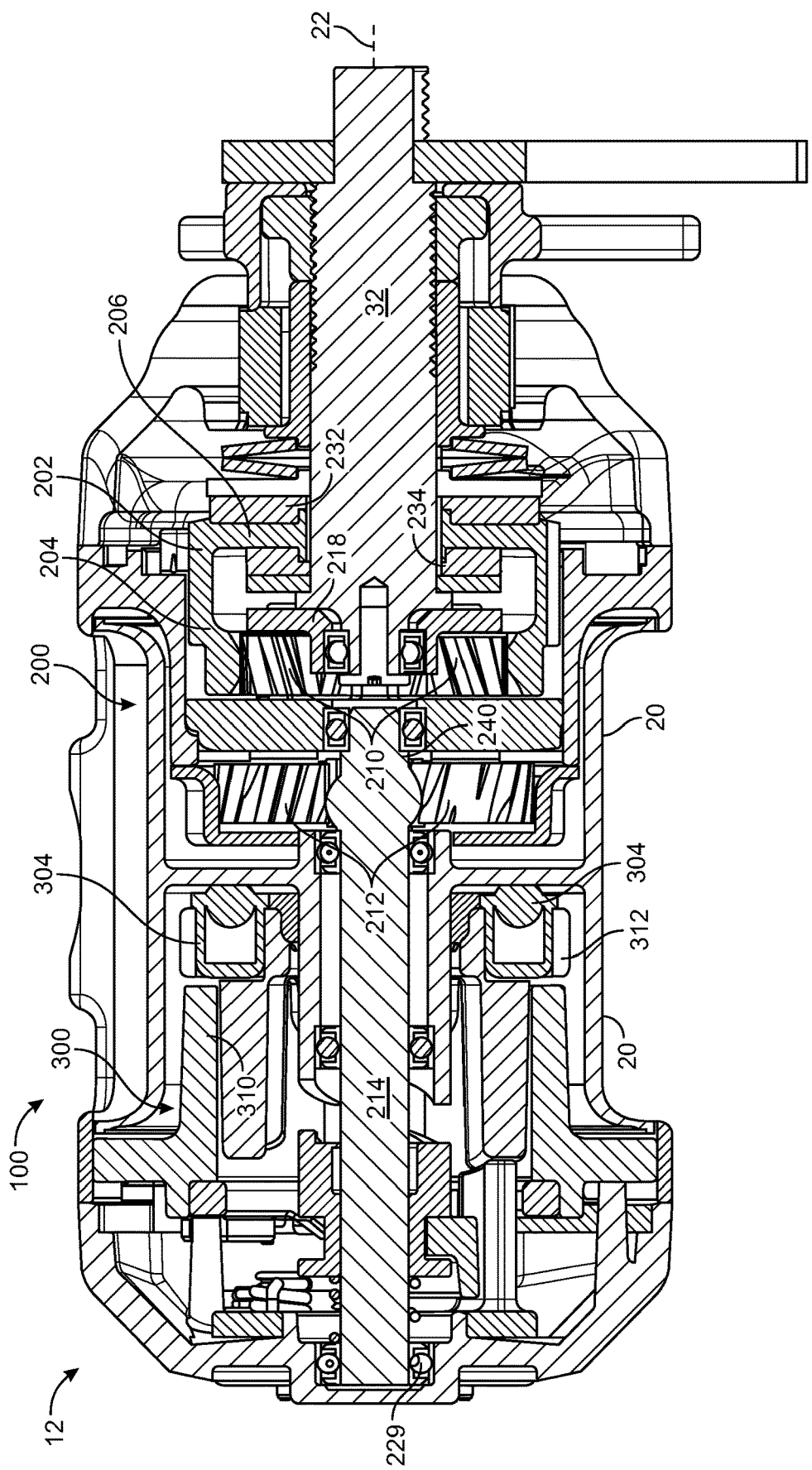
FIG. 9 is a sectional view of the baitcaster of FIG. 1 including a plunger sub-assembly, according to an exemplary embodiment.
Figure 10:
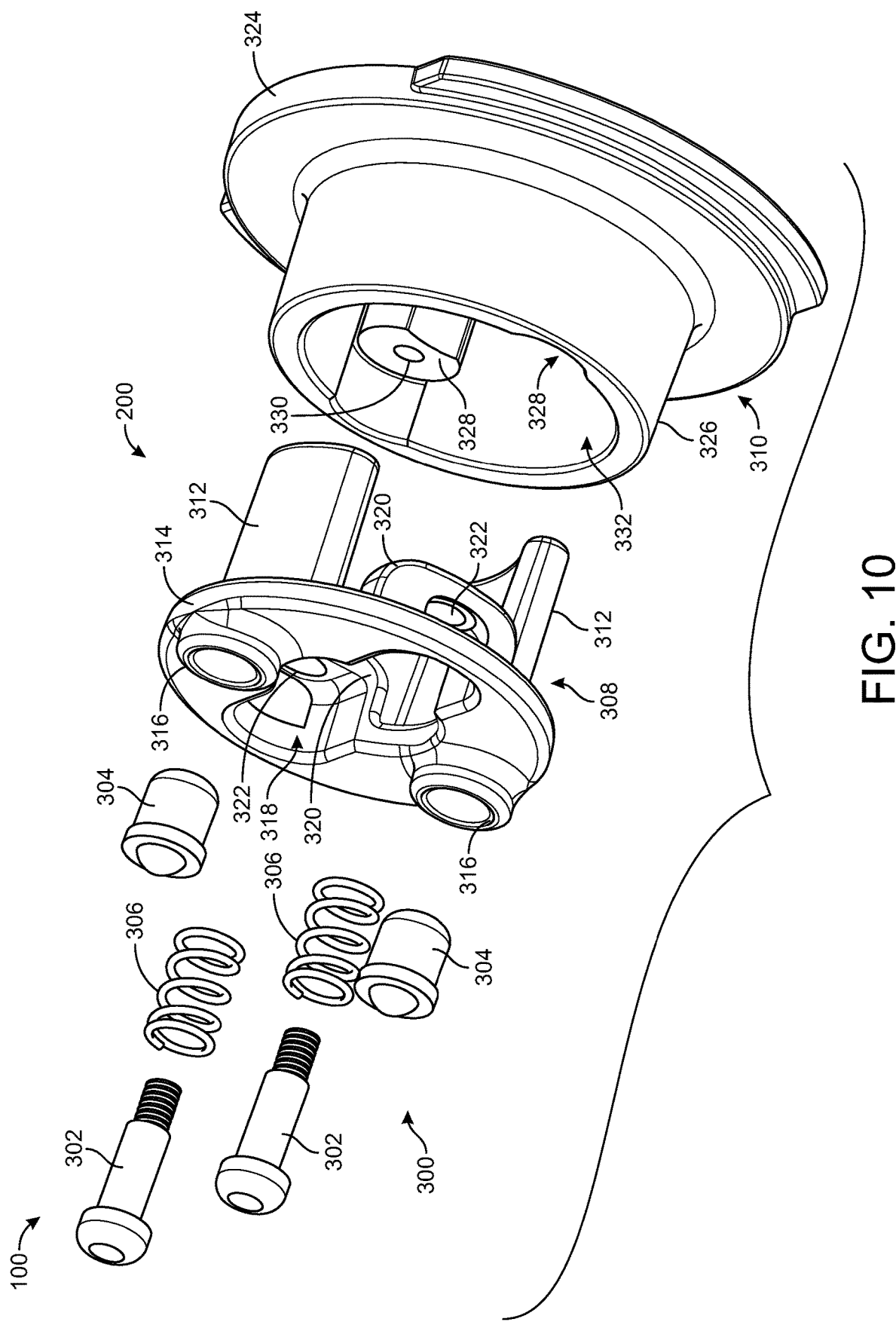
FIG. 10 is a perspective exploded view of the plunger sub-assembly of FIG. 9, according to an exemplary embodiment.

Referring particularly to FIGS. 9 and 10, reel 12 or spool drive mechanism 100 can include a plunger sub-assembly 300. Plunger sub-assembly 300 may be centered about axis 22. Plunger sub-assembly 300 may be positioned at least partially within spool 20. In some embodiments, plunger sub-assembly 300 includes a flange member, a receiving member, etc., shown as flange member 310. Plunger sub-assembly 300 can also include an intermediate member, a rotatable member, etc., shown as intermediate member 308. In some embodiments, flange member 310 includes a central aperture, a central volume, a bore, etc., shown as central volume 332. Central volume 332 is configured to receive a corresponding portion of intermediate member 308 therewithin. In some embodiments, flange member 310 and intermediate member 308 slidably or rotatably couple with each other such that intermediate member 308 can rotate relative to flange member 310.

Central volume 332 can have a cross-sectional shape that corresponds to an outer periphery of intermediate member 308. In some embodiments, flange member 310 includes a first portion, a radial protrusion portion, an annular protrusion, etc., shown as annular protrusion 324. Flange member 310 can include a cylindrical portion, a longitudinally extending portion, a second portion, etc., shown as longitudinally extending portion 326. Longitudinally extending portion 326 may extend from and be integrally formed with annular protrusion 324. Longitudinally extending portion 326 may extend longitudinally along axis 22 while annular protrusion 324 extends outwards from longitudinally extending portion 326 in a radially outwards direction.

Longitudinally extending portion 326 may define central volume 332 and can include one or more interfacing portions, coupling portions, etc., shown as interfacing portions 328. In some embodiments, interfacing portions 328 are positioned along an inner surface of longitudinally extending portion 326, or along an inner surface of central volume 332 (e.g., along a radially inwards facing surface). Interfacing portions 328 may be stepped cylindrical portions that are integrally formed with longitudinally extending portion 326 or with flange member 310 at the radially inwards facing surface defined by central volume 332. Interfacing portions 328 may each include an aperture, a bore, a blind hole, an inner volume, etc., shown as receiving aperture 330. In some embodiments, receiving apertures 330 are each configured to receive a corresponding fastener therethrough and facilitate removable fixed coupling between intermediate member 308 and flange ember 310.

Plunger sub-assembly 300 also includes several fasteners 302, several cylindrical or pin members 304, and several springs or tensile members, shown as springs 306. In some embodiments, springs 306 are compression springs that are configured to exert an expansive force when compressed. Fasteners 302 may extend through springs 306 and may fixedly couple (e.g., threadingly couple) with interfacing portions 328 through receiving apertures 330. In some embodiments, intermediate member 308 includes longitudinally extending tabs, protrusions, etc., shown as tabs 312 that include a radially outwards facing surface configured to slidably couple or frictionally interface with a corresponding radially inwards facing surface defined by central volume 332.

Intermediate member 308 includes receiving bores, blind holes, etc., shown as bores 316. In some embodiments, a number of bores 316 is equal to a number of pin members 304. Pin members 304 can be received within bores 316 and slidably couple with intermediate member 308 such that pin members 304 can slide within bores 316. In some embodiments, pin members 304 are configured to engage, directly contact, etc., a corresponding portion of spool 20. In some embodiments, pin members 304 include a step or an annular protrusion to facilitate preventing complete insertion of pin members 304 into bores 316.

Intermediate member 308 includes a central volume, a central aperture, a window, an opening, etc., shown as central window 318. In some embodiments, central window 318 has the shape of a slot. Intermediate member 308 can include engagement portions 320 that each include a bore, a through-hole, etc., shown as through-holes 322 configured to align and receive fasteners 302 therethrough. In some embodiments, through-holes 322 have a diameter that is substantially equal to or greater than an outer diameter of fasteners 302 but is less than springs 306. In this way, springs 306 can be positioned between a stepped end of fasteners 302 and engagement portions 320. Tabs 312 can have an outer periphery or an outer shape that corresponds to an inner periphery or an inner shape of central volume 332 so that tabs 312 are received within central volume 332.

Configuration of Exemplary Embodiments

As utilized herein, the terms "approximately", "about", "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claim.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like, as used herein, mean the joining of two members directly or indirectly to one another. Such joining may be stationary (e.g., permanent, etc.) or moveable (e.g., removable, releasable, etc.). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

It is important to note that the construction and arrangement of the systems as shown in the exemplary embodiments is illustrative only. Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

What is claimed is:

1. A baitcaster comprising:
   a body defining a proximate end and a distal end opposite the proximate end;
   a spool extending between the proximate end and the distal end;
   a handle extending from the proximate end and configured to receive an input torque; and a drive configured to receive the input torque from the handle at the proximate end, and drive the spool through a coupling at the distal end.

2. The baitcaster of claim 1, wherein the spool comprises an inner volume and a spool shaft having a central bore, the spool shaft positioned centrally within the spool.

3. The baitcaster of claim 2, wherein the drive comprises a gear set positioned within the body and at least partially within the inner volume of the spool, the gear set configured to receive the input torque through the handle and an input shaft at a proximate end of the gear set, the gear set further configured to output an output torque to an output shaft extending from a distal end of the gear set.

4. The baitcaster of claim 3, wherein the output shaft extends through the central bore of the spool shaft, the output shaft selectably rotatably coupled with the spool.

5. The baitcaster of claim 3, wherein the drive comprises a spool engagement mechanism at an end of the spool shaft that is proximate the distal end of the body, the spool engagement mechanism configured to transition between a first state to fixedly couple the spool with the output shaft so that the spool and the output shaft rotate in unison and a second state to de-couple the spool from the output shaft so that the spool and the output shaft are configured to rotate relative to each other.

6. The baitcaster of claim 5, wherein the spool engagement mechanism comprises:
an engagement member configured to translate along the output shaft between a first position and a second position, the engagement member fixedly coupled with the output shaft and comprising an interfacing portion configured to engage an interfacing portion of the spool shaft, wherein the interfacing portion of the engagement member and the interfacing portion of the spool shaft are configured to interlock with each other to rotatably fixedly couple the output shaft with the spool so that the output shaft and the spool rotate in unison when the engagement member is in the first position.

7. The baitcaster of claim 6, wherein the engagement member comprises an annular groove configured to receive a corresponding portion of a linkage.

8. The baitcaster of claim 7, wherein the linkage is positioned at the distal end of the body, the linkage configured to receive a user input to transition the engagement member between the first position and the second position.

9. The baitcaster of claim 6, wherein the spool engagement mechanism further comprises a spring configured to bias the engagement member into the first position.

10. A fishing rod comprising:
a rod; and
a baitcaster coupled with the rod, the baitcaster comprising:
a body defining a handle end and a distal end opposite the handle end;
a spool extending between the handle end and the distal end;
a handle extending from the handle end and configured to receive an input torque;
a spool drive mechanism configured to receive the input torque from the handle at the handle end, and drive the spool through a coupling at the distal end.

11. The fishing rod of claim 10, wherein the spool comprises an inner volume and a spool shaft having a central bore, the spool shaft positioned centrally within the spool.

12. The fishing rod of claim 11, wherein the spool drive mechanism comprises a gear set positioned within the body and at least partially within the inner volume of the spool, the gear set configured to receive the input torque through the handle and an input shaft at a handle end of the gear set, the gear set further configured to output an output torque to an output shaft extending from a distal end of the gear set.

13. The fishing rod of claim 12, wherein the output shaft extends through the central bore of the spool shaft, the output shaft selectably rotatably coupled with the spool.

14. The fishing rod of claim 12, wherein the spool drive mechanism comprises a spool engagement mechanism at an end of the spool shaft that is proximate the distal end of the body, the spool engagement mechanism configured to transition between a first state to fixedly couple the spool with the output shaft so that the spool and the output shaft rotate in unison and a second state to de-couple the spool from the output shaft so that the spool and the output shaft are configured to rotate relative to each other.

15. The fishing rod of claim 14, wherein the spool engagement mechanism comprises:
an engagement member configured to translate along the output shaft between a first position and a second position, the engagement member fixedly coupled with the output shaft and comprising an interfacing portion configured to engage an interfacing portion of the spool shaft, wherein the interfacing portion of the engagement member and the interfacing portion of the spool shaft are configured to interlock with each other to rotatably fixedly couple the output shaft with the spool so that the output shaft and the spool rotate in unison when the engagement member is in the first position.

16. The fishing rod of claim 15, wherein the engagement member comprises an annular groove configured to receive a corresponding portion of a linkage.

17. The fishing rod of claim 16, wherein the linkage is positioned at the distal end of the body, the linkage configured to receive a user input to transition the engagement member between the first position and the second position.

18. The fishing rod of claim 15, wherein the spool engagement mechanism further comprises a spring configured to bias the engagement member into the first position.

19. A baitcaster comprising:
a body defining a handle end and a distal end opposite the handle end;
a spool extending between the handle end and the distal end;
a spool drive mechanism configured to receive an input torque from a handle at the handle end, and drive the spool through a coupling at the distal end, the spool drive mechanism comprising:
a spool engagement mechanism configured to selectively transition between a first state and a second state, to fixedly couple or de-couple the spool with an output of the spool drive mechanism at the distal end of the baitcaster.

20. The baitcaster of claim 19, wherein the spool drive mechanism drives the spool through an engagement member, the engagement member translatable between a first position and a second position along an output shaft of the spool drive mechanism, the engagement member configured to fixedly couple the spool with the output shaft when in the first position and de-couple the spool from the output shaft when transitioned out of the first position and into the second position.

21. A baitcaster comprising:
a body defining a proximate end and a distal end opposite the proximate end;
a spool extending between the proximate end and the distal end;

a drive configured to receive an input torque from the proximate end, and drive the spool through a coupling at the distal end;

wherein the spool comprises an inner volume and a spool shaft having a central bore, the spool shaft positioned centrally within the spool;

wherein the drive comprises a gear set positioned within the body and at least partially within an inner volume of the spool, the gear set configured to receive the input torque at the proximate end and output an output torque to an output shaft extending from a distal end of the gear set.

* * * * *